United States Patent
Hayashi

(10) Patent No.: US 12,064,776 B2
(45) Date of Patent: Aug. 20, 2024

(54) LIQUID JETTING NOZZLE AND VEHICLE SENSOR WASHING DEVICE

(71) Applicant: DENSO CORPORATION, Kariya (JP)

(72) Inventor: Kiyoshi Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 524 days.

(21) Appl. No.: 17/424,158

(22) PCT Filed: Jul. 7, 2020

(86) PCT No.: PCT/JP2020/026576
§ 371 (c)(1),
(2) Date: Jul. 19, 2021

(87) PCT Pub. No.: WO2021/075096
PCT Pub. Date: Apr. 22, 2021

(65) Prior Publication Data
US 2022/0097084 A1  Mar. 31, 2022

(30) Foreign Application Priority Data
Oct. 18, 2019 (JP) .................. 2019-190784

(51) Int. Cl.
*B05B 1/26* (2006.01)
*B60S 1/52* (2006.01)
*B60S 1/56* (2006.01)

(52) U.S. Cl.
CPC .................... *B05B 1/26* (2013.01); *B60S 1/52* (2013.01); *B60S 1/56* (2013.01)

(58) Field of Classification Search
CPC .. B60S 1/52; B60S 1/56; B60S 1/0848; B05B 1/26; B05B 1/02; B05B 1/14; B05B 1/08; B05B 15/652; B08B 5/02
See application file for complete search history.

(56) References Cited

U.S. PATENT DOCUMENTS 7,775,456 B2 *  8/2010  Gopalan ................... B05B 1/08
                                            137/809
2004/0026528 A1  2/2004  Jenkins
(Continued)

FOREIGN PATENT DOCUMENTS

CN    109477450 A    3/2019
DE    60105805 T2    2/2006
(Continued)

*Primary Examiner* — Christopher R Dandridge
(74) *Attorney, Agent, or Firm* — Oliff PLC

(57) ABSTRACT

A liquid jetting nozzle-includes a tip body and a tip supported at the tip body. The tip body includes an introduction port which a liquid is introduced. A first and a second ejection port are formed in the tip and each jet out the liquid introduced through the introduction port. A first and a second conduit are formed in the tip. The first conduit structures a downstream side region of a first channel through which the liquid flows from the introduction port toward the side at which the first ejection port is formed. The second conduit structures a downstream side region of a second channel through which the liquid flows from the introduction port toward the side at which the second ejection port is formed. An angle formed between the first and second conduit is specified that the liquid jetting out from the first and second ejection port collide.

6 Claims, 16 Drawing Sheets

(56) References Cited

U.S. PATENT DOCUMENTS

| | | | |
|---|---|---|---|
| 2004/0117937 A1 | 6/2004 | Maruyama et al. | |
| 2018/0029566 A1 | 2/2018 | Gopalan et al. | |
| 2019/0202411 A1* | 7/2019 | Zhao | B60S 1/52 |
| 2021/0148321 A1 | 5/2021 | Mulye et al. | |

FOREIGN PATENT DOCUMENTS

| | | | |
|---|---|---|---|
| DE | 60303989 T2 | 10/2006 | |
| JP | S61-078768 U | 5/1986 | |
| JP | H06-047666 A | 2/1994 | |
| JP | 2002-240628 A | 8/2002 | |
| JP | 2003-534124 A | 11/2003 | |
| WO | WO-9407607 A1 * | 4/1994 | A61M 11/00 |
| WO | WO-2017172178 A1 * | 10/2017 | B05B 1/04 |

* cited by examiner

LIQUID JETTING NOZZLE AND VEHICLE SENSOR WASHING DEVICE

CROSS-REFERENCE TO RELATED APPLICATIONS

The present application is based on Japanese Patent Application No, 2019-190784, filed on Oct. 18, 2019, and the disclosures thereof are incorporated into the present specification.

Technical Field

The present disclosure relates to a liquid jetting nozzle and to a sensor washing device for a vehicle.

Background Art

Patent Document 1 mentioned below discloses a back-eye camera fora vehicle that is provided in the vehicle and removes water droplets adhering to a front surface of the camera by blowing air toward the front surface of the camera. The back-eye camera for a vehicle recited in Patent Document 1 is provided with a jetting out portion including plural jetting out apertures from which air is jetted out. The jetting out portion is arranged along an upper portion of the front surface of the camera.

RELATED ART REFERENCES

Patent References

Patent Document 1: Japanese Patent Application Laid-Open (JP-A) No. 2002-240628

SUMMARY OF INVENTION

Technical Problem

In a nozzle that jets a fluid (a gas or liquid) in order to remove foreign bodies adhering to a sensor such as a back-eye camera for a vehicle or the like, it is desirable that the fluid be jetted from the nozzle at a large area of the sensor. However, when a sensor is increased in size, as response is necessary such as providing plural nozzles, increasing the size of the nozzle and providing plural ejection ports, or the like. These responses are likely to raise costs, impair ease of installation in the vehicle and so forth.

In consideration of the circumstances described above, an object of the present disclosure is to provide a liquid jetting nozzle and a vehicle sensor washing device that may jet a washing liquid at a large area while restraining an increase in body size.

Solution to Problem

A liquid jetting nozzle according to a first aspect of the present disclosure includes: a nozzle main body including an introduction port at which a liquid is introduced; and a nozzle tip at which a first ejection port and a second ejection port are formed, the nozzle up being supported at the nozzle main body, and the first ejection port and second ejection port each jetting out the liquid that has been introduced via the introduction port, wherein: a first downstream side channel and a second downstream side channel are formed at the nozzle tip, the first downstream side channel configuring a downstream side region of a first channel through which the liquid flows from the introduction port toward a side of the first channel at which the first ejection port is formed, and the second downstream side channel configuring a downstream side region of a second channel through which the liquid flows from the introduction port toward a side of the second channel at which the second ejection port is formed, and an angle formed between the first downstream side channel and the second downstream side channel is configured such that the liquid jetted out from the first ejection port and the liquid jetted out from the second ejection port collide. A vehicle sensor washing device includes a liquid jetting nozzle that includes an introduction port at which a liquid is introduced, and includes a first ejection port and a second ejection port that each jet out the liquid that has been introduced via the introduction port, wherein: the liquid from the first ejection port is jetted out toward a side at which a sensor provided at the vehicle is disposed, the liquid from the second ejection port is jetted out toward an opposite side from the side at which the sensor is disposed, and the liquid jetted out from the first ejection port and the liquid jetted out from the second ejection port collide and a collided flow of the liquid is directed at the sensor.

BRIEF DESCRIPTION OF DRAWINGS

The above-described object of the present disclosure and other objects, features and advantages of the present invention will be apparent from the following descriptions with reference to the accompanying drawings, wherein.

DETAILED DESCRIPTION

Figure 1:
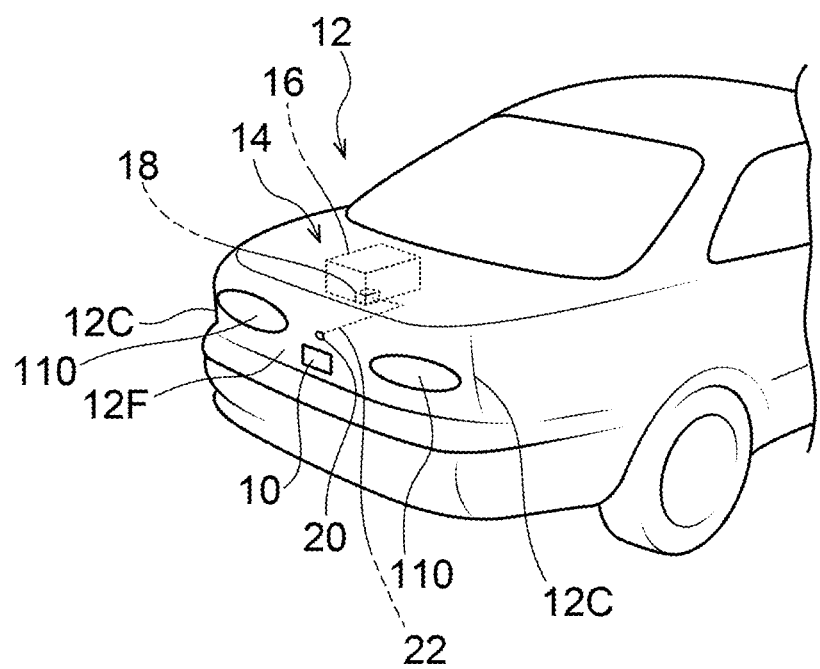
FIG. 1 is a perspective view showing a vehicle, and a sensor and a washing liquid jetting nozzle provided at a front portion of the vehicle.
Figure 2:
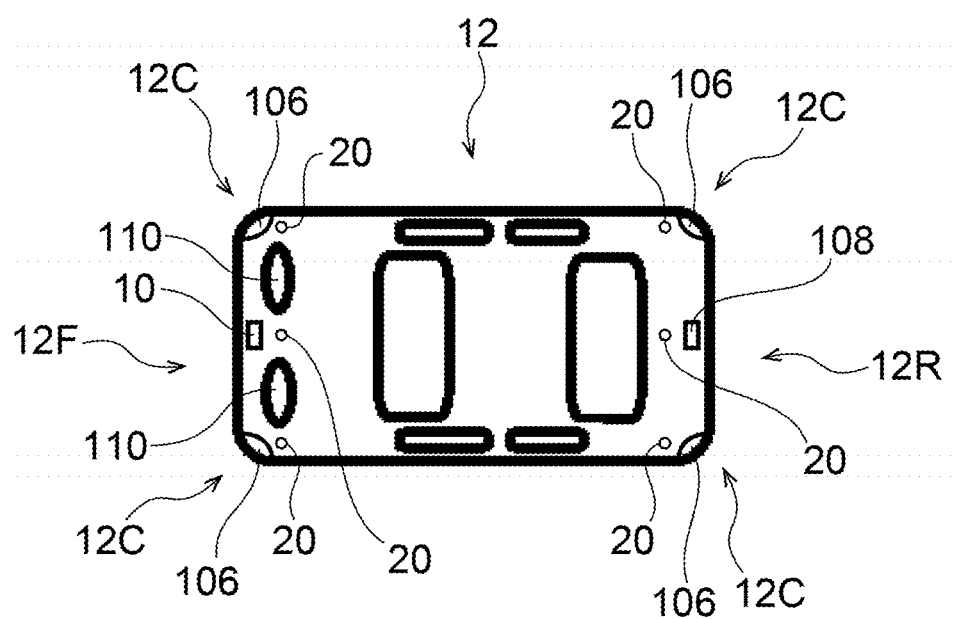
FIG. 2 is a plan view showing the vehicle shown in FIG. 1.

FIG. 1 and FIG. 2 show a vehicle 12 equipped with a sensor 10 that detects objects to a front side. As shown in these drawings, the sensor 10 is attached (fixed) at the middle in the vehicle width direction of a front portion 12F of the vehicle 12, in a state in which a front surface of the sensor 10 is oriented to the front side of the vehicle 12. The sensor 10 according to the present exemplary embodiment is a sensor known as a lidar (LIght Detection And Ranging or Laser Imaging Detection And Ranging). The sensor 10 illuminates laser light and detects reflections that are incident on and bounce back from objects. Thus, the sensor 10 may measure distances and directions to the objects. In a vehicle front view (in which the vehicle 12 is seen from the front side of the vehicle 12), the sensor 10 according to the present exemplary embodiment is formed in a rectangular shape whose longer direction is in the left-and-right direction.

As shown in FIG. 1, a sensor washing device 14 is provided at the vehicle 12. The sensor washing device 14 washes the front surface of the sensor 10 by jetting the washing liquid, Which serves as a liquid, at the front surface of the sensor 10. The sensor washing device 14 is provided with a tank 16, a pump 18, a washing liquid jetting nozzle 20 and a connecting pipe 22, The tank 16 retains the washing liquid. The pinup 18 is attached to the tank 16. The washing liquid jetting nozzle 20 is fixed to the front portion 12F of the vehicle 12 at the upper side of the sensor 10 and serves as a liquid jetting nozzle. The connecting pipe 22 connects the pump 18 with the washing liquid jetting nozzle 20. When the pump 18 operates, the washing liquid in the tank 16 is pumped through the pump 18 and the connecting pipe 22 to the washing liquid jetting nozzle 20, and the washing liquid is jetted out from the washing liquid jetting nozzle 20.

Figure 3:
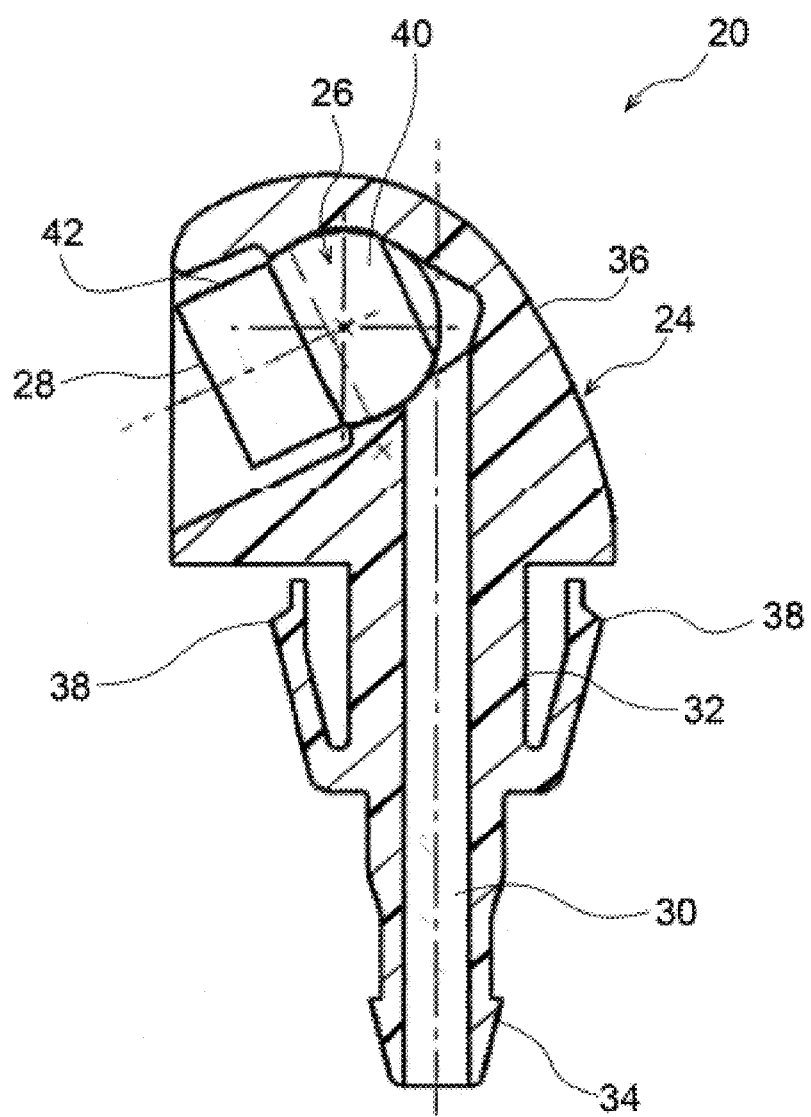
FIG. 3 is a partial sectional diagram showing a partial section of the washing liquid jetting nozzle.
Figure 4:
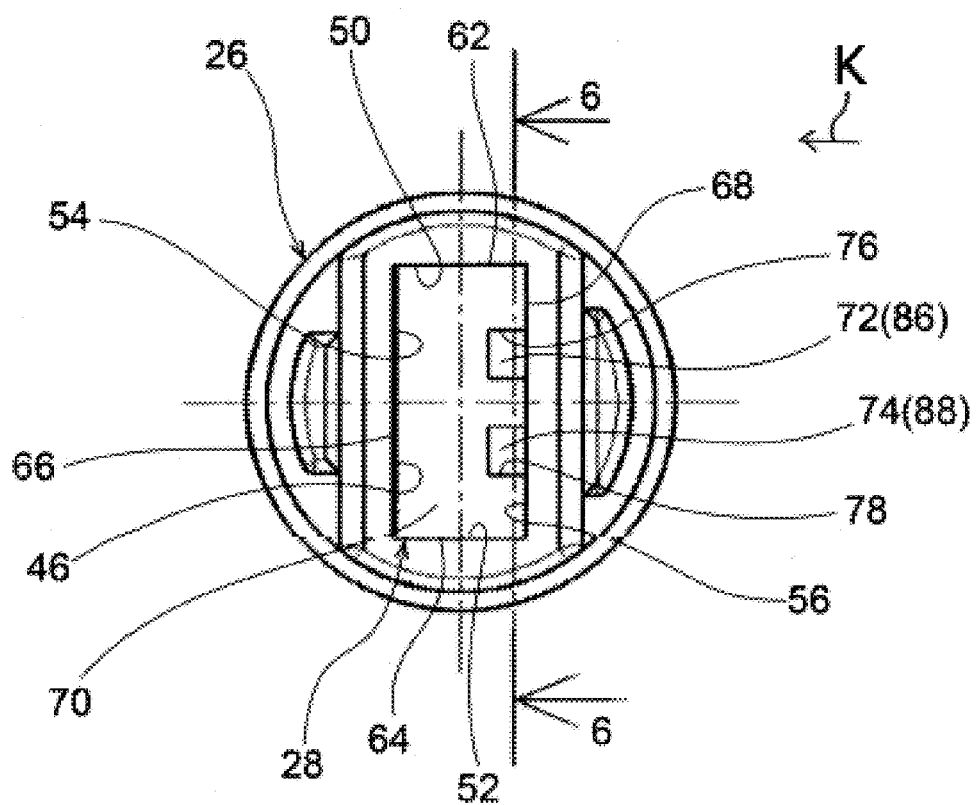
FIG. 4 is a front view showing a tip and a tip body.
Figure 5:
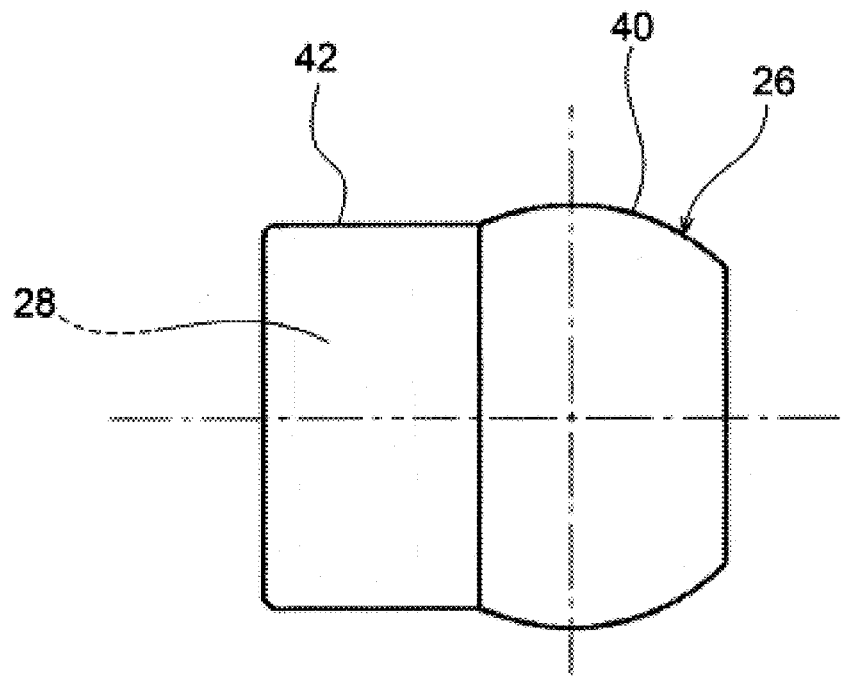
FIG. 5 is a side view in which the tip and tip body are seen in a direction orthogonal to a direction in which a first ejection port and a second ejection port are arrayed.

As shown in FIG. 3 and FIG. 4, the washing liquid, jetting nozzle 20 is provided with a nozzle body 24, a tip body 26 and a tip 28, The tip body 26 is supported at the nozzle body 24 and serves as a nozzle main body. The tip 28 is supported at the tip body 26 and serves as a nozzle tip.

As shown in FIG. 3, the nozzle body 24 is formed using a resin material. The nozzle body 24 is provided with a main channel formation portion 32 which is formed in a tubular shape and inside which a main channel 30 through which a washing liquid passes is formed. An end portion at one side of the main channel formation portion 32 is formed as a connecting pipe connection portion 34 at which the connecting pipe 22 is connected (see FIG. 1). The nozzle body 24 is further provided with a tip body support portion 36, which is formed integrally with an end portion at the other side of the main channel formation portion 32. The interior of the tip body support portion 36 is in fluid communication with the main channel 30. The tip body 26, which is described below, is turnably supported at a spherical surface at the side of the interior of the tip body support portion 36 at which the main channel 30 is disposed. Consequently, an attitude of the tip body 26 relative to the nozzle body 24 may be adjusted within a predetermined range. The opposite side of the tip body support portion 36 from the side thereof at which the main channel 30 is disposed (i.e., a downstream side) is open. The nozzle body 24 is provided with a pair of engaging portions 38 that protrude from the main channel formation portion 32. The engaging portions 38 are engaged with portions of the vehicle 12 (see FIG. 1). That is, at bracket or the like that secures the sensor 10 to the vehicle 12 is disposed between the engaging portions 38 and the tip body support portion 36. Thus, the nozzle body 24 (the washing liquid jetting nozzle 20) is attached (fixed) at the side thereof at which the vehicle 12 is disposed. In the state in which the nozzle body 24 (the washing liquid jetting nozzle 20) is attached to the vehicle 12, the opposite side of the tip body support portion 36 from the side thereof at which the main channel 30 is disposed (i.e., the open side) is oriented toward the lower side of the vehicle 12. The nozzle body 24 may be fixed to a rod with a telescopic structure, which rod projects to the front side of the vehicle 12 from the front portion 12F of the vehicle 12. Thus, the nozzle body 24 (the washing liquid jetting nozzle 20) may be disposed to the front side of the front portion 12F of the vehicle 12.

As shown in FIG. 3 to FIG. 7, similarly to the nozzle body 24, the tip body 26 is formed using a resin material. The tip body 26 is formed in a barrel shape (a tube shape) of which both ends are open. A proximal end side 40 of the tip body 26 (a region supported at the tip body support portion 36 of the nozzle body 24) bulges further to diameter direction outer sides than a distal end side 42 of the tip body 26. An outer periphery face of the proximal end side 40 of the tip body 26 is formed in a spherical surface shape. The tip body 26 is pushed into the tip body support portion 36 of the nozzle body 24 through the opposite side of the tip body support portion 36 from the side thereof at which the main channel 30 is disposed. Thus, the tip body 26 is attached to the tip body support portion 36 of the nozzle body 24 to be liquid-tight.

Figure 6:
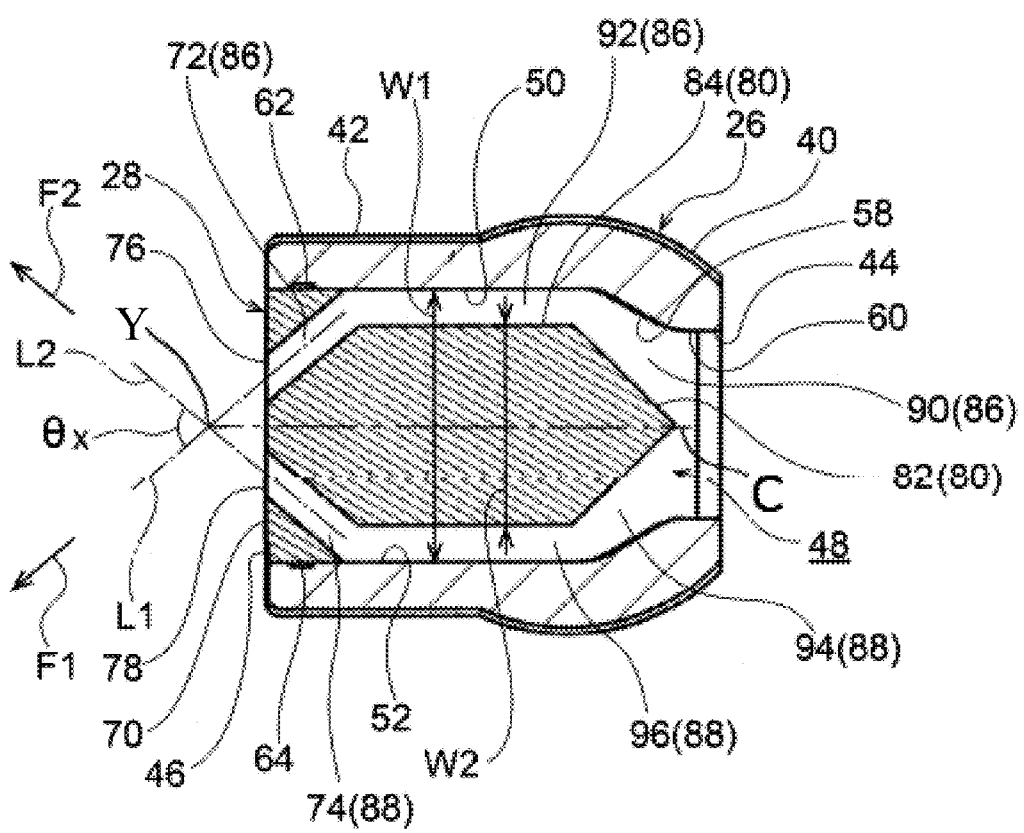
FIG. 6 is a side sectional diagram showing the tip and tip body cut along line 6-6 shown in FIG. 4.
Figure 7:
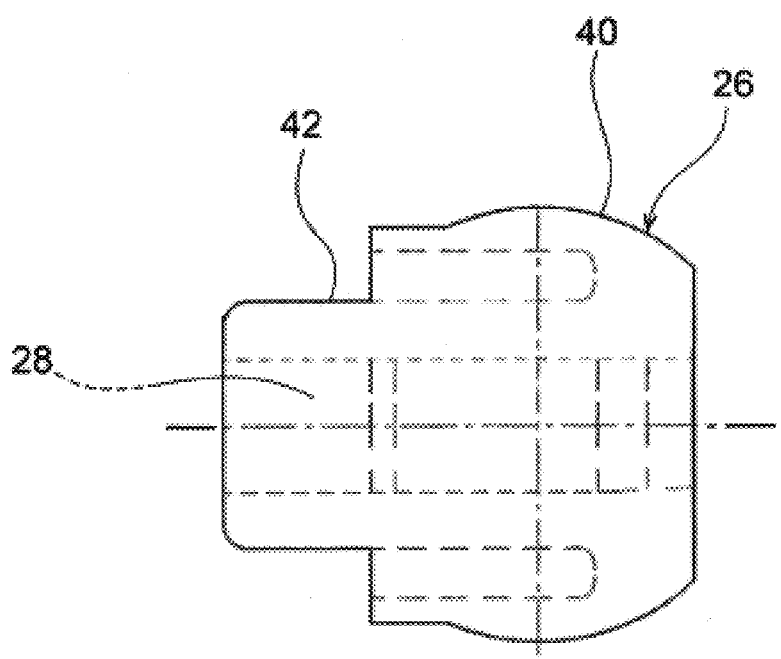
FIG. 7 is a side view in which the tip and tip body are seen in the direction in which the first ejection port and the second ejection port are arrayed.

As shown in FIG. 3 and FIG. 6, an aperture at the proximal end side 40 of the tip body 26 serves as an introduction port 44, at which washing liquid flowing into the tip body support portion 36 from the main channel 30 of the nozzle body 24 is introduced into the tip body 26. An aperture at the distal end side 42 of the tip body 26 serves as a tip insertion aperture 46, most of which is closed off by the tip body 26, which is described below. The tip 28, which is described below, is pushed into the tip body 26 through the tip insertion aperture 46, Hence, the tip 28 is attached (fixed) to the tip body 26, and the tip 28 is disposed in most of a space 48 in the tip body 26.

As shown in FIG. 4 and FIG. 6, the space 48 in the tip body 26 is formed in a rectangular shape as seen from the side thereof at which the tip insertion aperture 46 is formed. A from wall 50, a rear wall 52, a right wall 54 and a left wall 56 that loon inner side surfaces of the tip body 26 serve as faces of the space 48 inside the tip body 26. The front wall 50 and rear wall 52 are parallel with one another, and the right wall 54 and left wall 56 are parallel with one another. A taper wall 58 also serves as a face of the space 48 in the tip body 26. The taper wall 58 connects with the front wall 50, rear wall 52, right wall 54 and left wall 56, and the taper wall 58 progressively narrows toward the side thereof at which the introduction port 44 is formed. An introduction wall 60 also serves as a face of the space 48 in the tip body 26, The introduction wall 60 connects with the taper wall 58 and forms an aperture with the same opening area as the introduction port 44.

Similarly to the nozzle body 24 and the tip body 26, the tip 28 is formed using a resin material. The tip 28 is formed in a rectangular shape as seen from the side thereof at which the tip insertion aperture 46 of the tip body 26 is disposed. In the descriptions below, portions of the tip 28 are described as in the state in which the tip 28 is attached to the tip body 26.

The tip 28 is provided with a front face 62, a rear face 64, a right face 66 and a left face 68 that touch, respectively, the front wall 50, the rear wall 52, the right wall 54 and the left wall 56 of the tip body 26. The tip 28 is also provided with a tip face 70 that is disposed at the same position as the tip insertion aperture 46 of the tip body 26. The tip face 70 is exposed to the outside of the tip body 26 at the opposite side of the tip body 26 from the side thereof at which the introduction port 44 is formed.

A first conduit 72 that serves as a first downstream side channel and a second conduit 74 that serves as a second downstream side channel are each formed in the tip 28, at the side thereof at which the left face 68 is provided. The first conduit 72 and second conduit 74 open out at the side thereof at which the left wall 56 of the tip body 26 is disposed.

One end of the first conduit 72 serves as a first ejection port 76 that opens out at the side thereof at which the tip face 70 is provided. The other end of the first conduit 72 opens out inside the tip body 26 at the side thereof at which the front wall 50 is disposed. In the direction away from the introduction port 44 of the tip body 26 toward the side at which the tip insertion aperture 46 is formed, the first conduit 72 is inclined from the side of the tip body 26 at Which the front wall 50 is disposed toward the side at which the rear wall 52 is disposed.

One end of the second conduit 74 serves as a second ejection port 78 that opens out at the side thereof at which the tip face 70 is provided. The other end of the second conduit 74 opens out inside the tip body 26 at the side thereof at which the rear wall 52 is disposed. In the direction away from the introduction port 44 of the tip body 26 toward the side of the tip insertion aperture 46, the second conduit 74 is inclined front the side of the tip body 26 at which the rear wall 52 is disposed toward the side at which the front wall 50 is disposed.

Because of the inclination of the first conduit 72 and the second conduit 74, a conduit Center L1 of the first conduit 72 and a conduit center L2 of the second conduit 74 intersect outside the tip body 26, at the opposite side thereof from the side at which the introduction port 44 is formed. (i.e., at the side at which the tip insertion aperture 46 is formed). The conduit center L1 of the first conduit 72 is a line passing along the center in a width direction of the first conduit 72 as seen in the direction in which the first conduit 72 opens out (the direction of arrow K in FIG. 4). The conduit center L2 of the second conduit 74 is a line passing along the center in a width direction of the second conduit 74 as seen in the direction in which the second conduit 74 opens out (the direction of arrow K in FIG. 4). An angle θx formed between the first conduit 72 and the second conduit 74, which is to say an angle θx formed between the conduit center L1 of the first conduit 72 and the conduit center L2 of the second conduit 74, is referred to as a collision angle θx.

As shown in FIG. 6, a region of the tip 28 that is further to the side of the tip body 26 at which the introduction port 44 is formed than the first conduit 72 and the second conduit 74 serves as a channel formation portion 80. A dimension W2 of the channel formation portion 80 to dimension thereof in the direction in which the front wall 50 and the rear wall 52 oppose one another) is smaller than a dimension W1 from the front wall 50 to the rear wall 52 of the tip body 26. An end portion of the channel formation portion 80 at the side thereof at which the introduction port 44 is formed serves as a flow-directing portion 82. The flow-directing portion 82 is formed so as to progressively narrow toward the side thereof at which the introduction port 44 is formed and such that the end of the flow-directing portion 82 at the side at which the introduction port 44 is Rimed tapers to a point. A region of the channel formation portion 80 that is further to the side thereof at which the first conduit 72 and second conduit 74 are formed than the flow-directing portion 82, which is a region in which the aforementioned dimension W2 is a constant dimension, serves as a middle channel formation portion 84.

Because the tip 28 is structured as described above, a first channel 86 and a second channel 88 are formed between the tip 28 and the tip body 26. The washing liquid flows through each of the first channel 86 and the second channel 88 from the introduction port 44 of the tip body 26 to the side of the tip 28 at which the first ejection port 76 and second ejection port 78 are formed.

To describe this in more detail, an upstream side region of the first channel 86 is formed between the flow-directing, portion 82 of the tip 28 and a region of the taper wall 58 of the tip body 26 that is at the side at which the front wall 50 is disposed. The upstream side region of the first channel 86 that is formed between the flow-directing portion 82 of the tip 28 and the region of the taper wall 58 of the tip body 26 at the side at which the front wall 50 is disposed is referred to as a first upstream side channel 90.

A midstream region of the first channel 86 is formed between the middle channel formation portion 84 of the tip 28 and the front wall 50 of the tip body 26. The midstream region of the first channel 86 that is formed between the middle channel formation portion 84 of the tip 28 and the front wall 50 of the tip body 26 is referred to as a first midstream side channel 92.

A downstream side region of the first channel 86 is thrilled by the above-described first conduit 72 formed in the tip 28. The open end side of the first conduit 72 formed in the tip 28 is closed off by the left wall 56 of the tip body 26. Therefore, the downstream side region of the first channel 86 can be described as being formed between the above-described first conduit 72 thrilled in the tip 28 and the left wall 56 of the tip body 26.

An upstream side region of the second channel 88 is formed between the flow-directing portion 82 of the tip 28 and a region of the taper wall 58 of the tip body 26 that is at the side at which the rear wall 52 is disposed. The upstream side region of the second channel 88 that is formed between the flow-directing portion 82 of the tip 28 and the region of the taper wall 58 of the tip body 26 at the side at which the rear wall 52 is disposed is referred to as a second upstream side channel 94.

A midstream region of the second channel 88 is formed between the middle channel formation portion 84 of the tip 28 and the rear wall 52 of the tip body 26. The midstream region of the second channel 88 that is formed between the middle channel formation portion 84 of the tip 28 and the rear wall 52 of the tip body 26 is referred to as a second midstream side channel 96.

A downstream side region of the second channel 88 is formed by the above-described second conduit 74 formed in the tip 28. The open end side of the second conduit 74 formed in the tip 28 is closed off by the left wall 56 of the tip body 26. Therefore, the downstream side region of the second channel 88 can be described as being formed between the above-described second conduit 74 formed in the tip 28 and the left wall 56 of the tip body 26.

In the present exemplary embodiment, the first upstream side channel 90 and second upstream side channel 94 of the first channel 86 and second channel 88 are formed with mutually equal channel cross-section areas, the first midstream side channel 92 and second upstream side channel 94 are formed with mutually equal channel cross-section areas, and the first conduit 72 and second conduit 74 are formed with mutually equal channel cross-section areas. The flow-directing portion 82 is formed with mirror symmetry about a central axis line C in the insertion direction of the tip 28, which passes through an intersection point Y at which the conduit center L1 of the first conduit 72 and the conduit center L2 of the second conduit 74 intersect. Thus, the flow-directing portion 82 is formed such that equal flow amounts are distributed to the first channel 86 and the second channel 88.

Operation and Effects of the Present Exemplary Embodiment

Now, operation and effects of the present exemplary embodiment are described.

As shown in FIG. 1, when the vehicle 12 provided with the sensor 10 described above is running, sand, salt and the like may adhere to the front surface of the sensor 10, in which case accuracy of detection by the sensor 10 of objects to the front side of the vehicle 12 may deteriorate. Accordingly, when sand, salt or the like is adhered to the front surface of the sensor 10, the pump 18 of the sensor washing device 14 operates.

When the pump 18 operates, washing liquid in the tank 16 is pumped through the pump 18 and the connecting pipe 22 to the washing liquid jetting nozzle 20, and the washing liquid is jetted from the washing liquid jetting nozzle 20. The front surface of the sensor 10 is washed by the washing liquid jetting from the washing liquid jetting nozzle 20.

In the present exemplary embodiment, as shown in FIG. 6, the first conduit 72 and second conduit 74 formed in the tip 28 that constitutes a portion of the washing liquid jetting nozzle 20 are inclined. As a result, the conduit center L1 of the first conduit 72 and the conduit center L2 of the second conduit 74 intersect outside the tip body 26, at the opposite side of the tip body 26 from the side thereof at which the introduction port 44 is formed (i.e., at the side at which the tip insertion aperture 46 is formed). Consequently, the washing liquid jetted out (jetted) from the first ejection port 76 and the washing liquid jetted out (jetted) from the second ejection port 78 may be caused to collide and a collided flow of the colliding washing liquid may be dispersed in desired directions. Therefore, in the washing liquid jetting nozzle 20 according to the present exemplary embodiment, the washing liquid may be jetted against a large area of the front surface of the sensor 10.

As shown in FIG. 1, the sensor 10 according to the present exemplary embodiment attached in a state in which the front surface faces to the front side of the vehicle 12 from the middle in the vehicle width direction of the front portion 12F of the vehicle 12. In a vehicle front view, the sensor 10 is formed in the rectangular shape whose longer direction is in the left-and-right direction. In order to wash the sensor 10 with this disposition and shape effectively, the washing liquid jetting nozzle 20 may be specified as follows.

Structure for Washing the Sensor 10 Effectively

Figure 8:
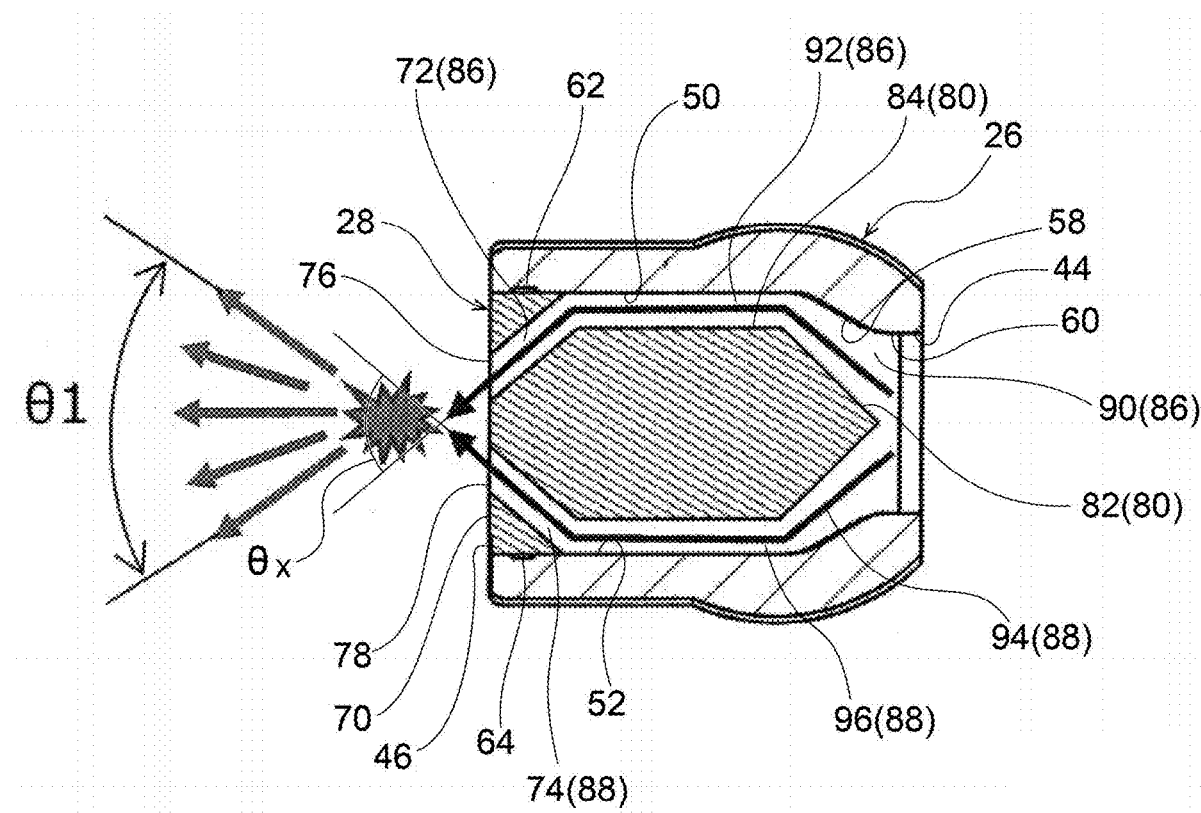
FIG. 8 is a side sectional diagram, corresponding to FIG. 6, schematically showing paths of washing liquid jetted from the first ejection port and the second ejection port.

FIG. 8 is a diagram depicting a range in which the collided flow spreads after the washing liquid jetted out from the first ejection port 76 and the washing liquid jetted out from the second ejection port 78 collide, when the tip body 26 and the tip 28 are viewed in a direction orthogonal to the direction in which the first ejection port 76 and the second ejection port 78 are arrayed. It is found through testing of the washing liquid jetting nozzle 20 according to the present exemplary embodiment that, viewing the tip body 26 and tip 28 in the direction orthogonal to the direction in which the first ejection port 76 and second ejection port 78 are arrayed, the collided flow idler the washing liquid jetted out from the first ejection port 76 and the washing liquid jetted out from the second ejection port 78 collide spreads in a fan shape. A central angle θ1 of the range in which the washing liquid spreads in the fan shape (a region identified as the fan shape) when viewed in this direction is referred to as the first spreading range θ1".

Figure 9:
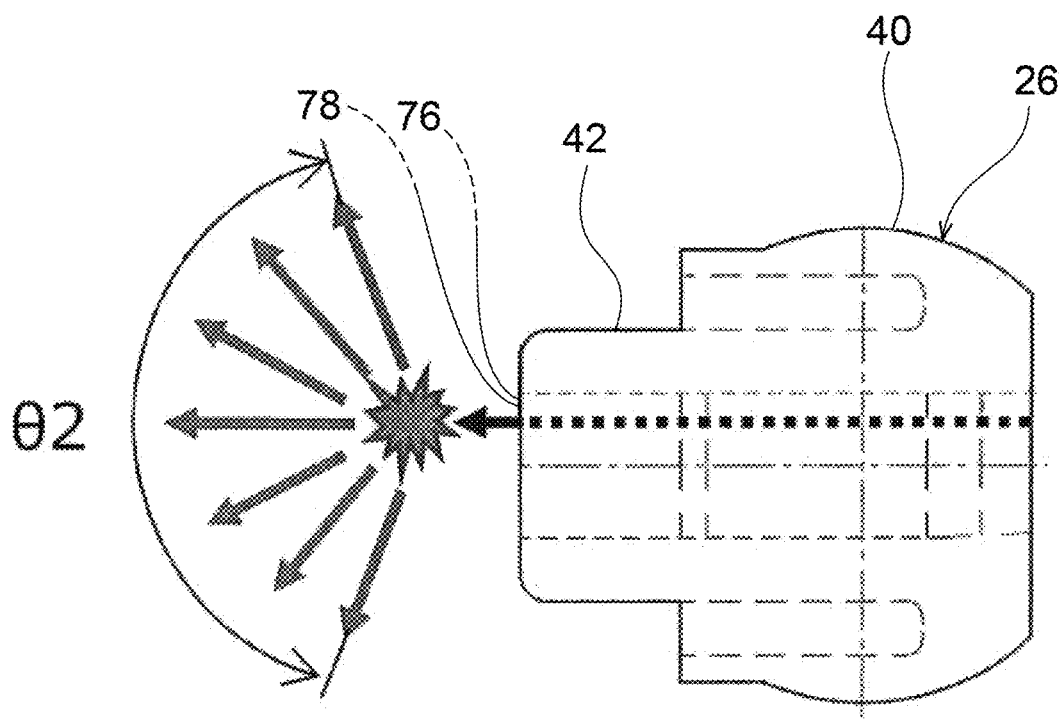
FIG. 9 is a side view, corresponding to FIG. 7, schematically showing the paths of washing liquid jetted from the first ejection port and the second ejection port.

FIG. 9 is a diagram depicting a range in which the collided flow spreads after the washing liquid jetted out from the first ejection port 76 and the washing liquid jetted out from the second ejection port 78 collide, when the tip body 26 and tip 28 are viewed in the direction in which the first ejection port 76 and the second ejection port 78 are arrayed. It is found through testing of the washing liquid jetting nozzle 20 according to the present exemplary embodiment that, viewing the tip body 26 and tip 28 in the direction in which the first ejection port 76 and second ejection port 78 are arrayed, the collided flow after the washing liquid jetted out from the first ejection port 76 and the washing liquid jetted out from the second ejection port 78 collide spreads in a fan shape. A central angle θ2 of the range in which the washing liquid spreads in the fan shape (a region identified as the fan shape) when viewed in this direction is referred to as "the second spreading range θ2".

Figure 10:
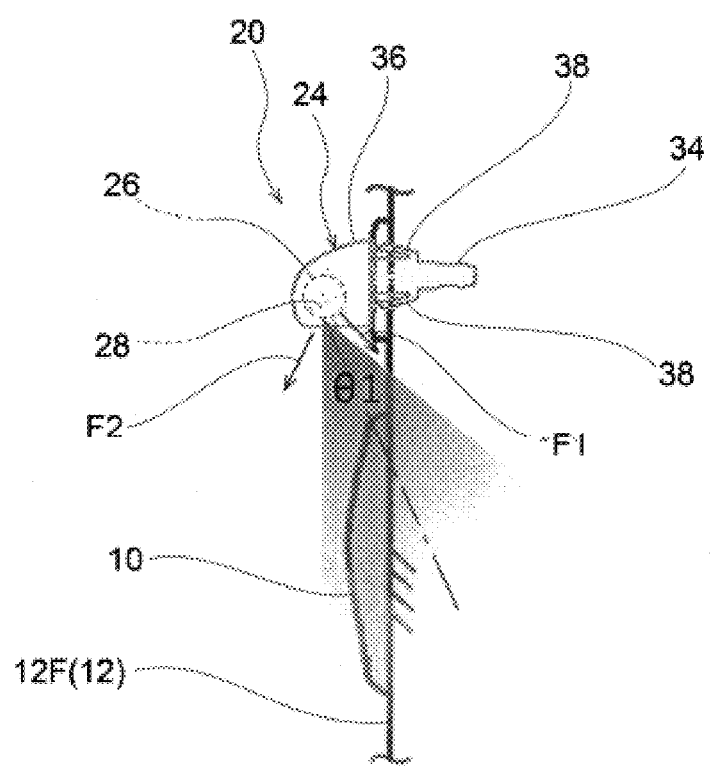
FIG. 10 is a side view schematically showing paths of washing liquid jetted from the washing liquid jetting nozzle toward the sensor.

The angle θx Formed between the first conduit 72 and the second conduit 74 is specified such that the second spreading angle θ2 is wider than the first spreading angle θ1. Moreover, as shown in FIG. 8 and FIG. 10, the washing liquid is jetted out from the first ejection port 76 toward the side thereof at which the sensor 10 is disposed (toward the side of the direction of arrow F1). (Toward the lower side (the lower side in FIG. 10), the washing liquid jetted out from the first ejection port 76 is angled toward the rear side of the vehicle 12 (the right side in FIG. 10).) Meanwhile, the washing liquid is jetted out from the second ejection port 78 toward the opposite side from the side thereof at which the sensor 10 is disposed (toward the side of the direction of arrow F2). (Toward the lower side, the washing liquid jetted out from the second ejection port 78 is angled toward the front side of the vehicle 12 (the left side in FIG. 10))

Figure 11:
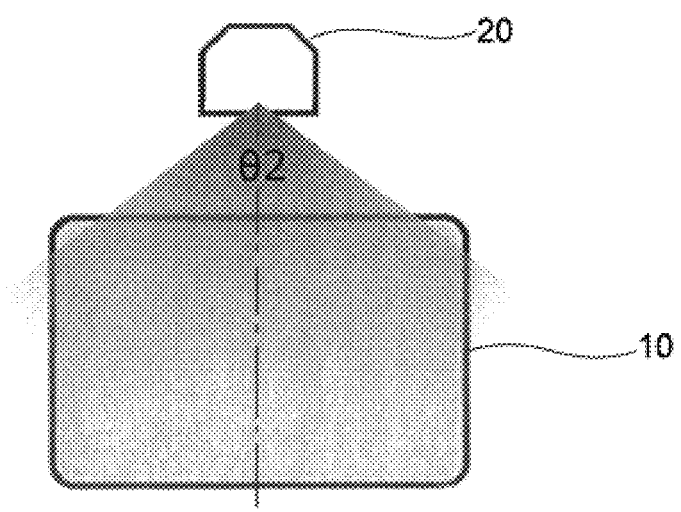
FIG. 11 is a front view schematically showing paths of the washing liquid jetted from the washing liquid jetting nozzle toward the sensor.

With the specifications described above, as shown in FIG. 10 and FIG. 11, even when jetting distances from jetting positions to water strike positions are relatively short, the washing liquid may be jetted from the washing liquid jetting nozzle 20 to the sensor 10 in a wide range that is more widely spread in the left-and-right direction than in the vertical direction (the second spreading angle θ2 is wider than the first spreading angle θ1). Thus, the sensor 10 that is formed in the rectangular shape whose longer direction is in the left-and-right direction in the vehicle front view may be washed effectively. Bisecting lines (central lines) that equally divide the angle θ1 and the angle θ2 shown in, respectively, FIG. 10 and FIG. 11 are referred to as jetting axes.

In the present exemplary embodiment, as shown in FIG. 6, because the flow-directing portion 82 provided in the tip 28 is formed such that the tip body 26 narrows toward the side at which the introduction port 44 of the tip body 26 is formed, the washing liquid introduced through the introduction port 44 may be smoothly divided and distributed to the sides at which the first channel 86 and the second channel 88 are formed. In this structure, there is no need to provide a flow-directing portion at the tip body 26 side to divide and distribute the washing liquid introduced through the introduction port 44 to the sides at which the first channel 86 and the second channel 88 are formed.

In the present exemplary embodiment, the first channel 86 and the second channel 88 are formed between the tip 28 and the tip body 26. According to this structure, an increase in complexity of structures and fabrication processes of the tip 28 and the tip body 26 or the like may be suppressed.

In the present exemplary embodiment, the first conduit 72 and second conduit 74 formed in the tip 28 determine the collision angle θx between the washing liquid jetting out from the first ejection port 76 and the washing liquid jetting out from the second ejection port 78. In other words, principal portions of the first downstream side channel structuring the downstream side region of the first channel 86 and principal portions of the second downstream side channel structuring the downstream side region of the second channel 88 are not structured by the two components: the tip 28 and the tip body 26. Therefore, a structure may be provided in which the collision angle θx between the washing liquid jetting out from the first ejection port 76 and the washing liquid jetting out from the second ejection port 78 is unlikely to be influenced by irregularities in assembly precision of components.

In the present exemplary embodiment, as shown in FIG. 3 and FIG. 6, the tip 28 is attached to the tip body 26 by being pushed into the tip body 26, and the tip body 26 to which the tip 28 has been attached is attached to the nozzle body 24. The washing liquid jetting nozzle 20 may be fabricated in this way. According to this three-component structure in which members for retaining the tip 28 in the tip body 26 are unnecessary, costs and material quantities of the washing liquid jetting nozzle 20 may be reduced.

By the nozzle body 24 and the tip body 26 being used as common components and only the structure of the tip 28 being altered, the washing liquid jetting nozzle 20 may obviously be provided with a different first spreading angle θ1 and second spreading angle θ2. In addition, the washing liquid jetting nozzle 20 may be provided with various jetting patterns. Below, a tip 100 that implements an alternative jetting pattern is described.

Alternative Exemplary Embodiment of Tip 100

Figure 12:
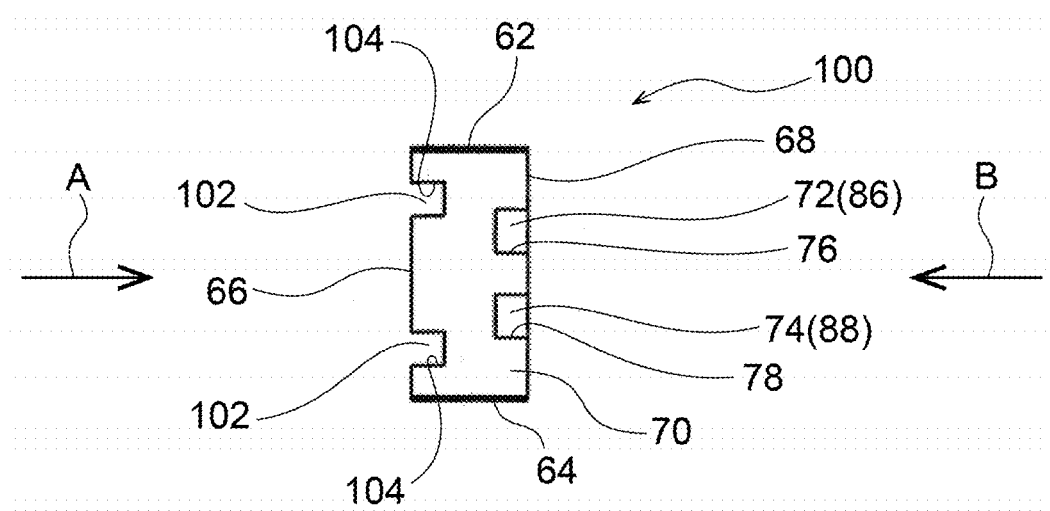
FIG. 12 is a front view showing an alternative exemplary embodiment of the tip.
Figure 13:
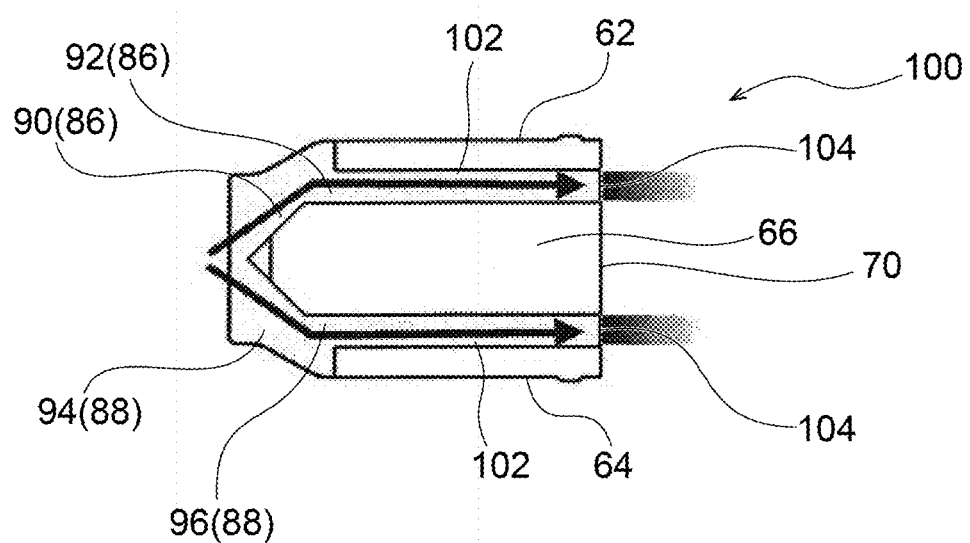
FIG. 13 is a side view showing the tip, seen in the direction of arrow A shown in FIG. 12, which is a side view schematically showing flows of washing liquid jetted out from third ejection ports.
Figure 14:
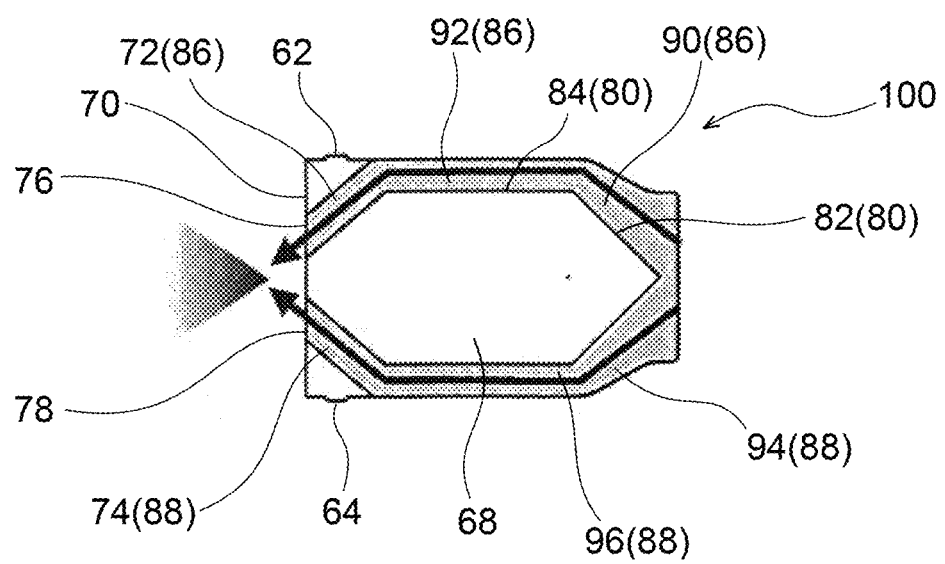
FIG. 14 is a side view showing the tip, seen in the direction of arrow B shown in FIG. 12, which is a side view schematically showing flows of washing liquid jetted out from a first ejection port and second ejection port.
Figure 15:
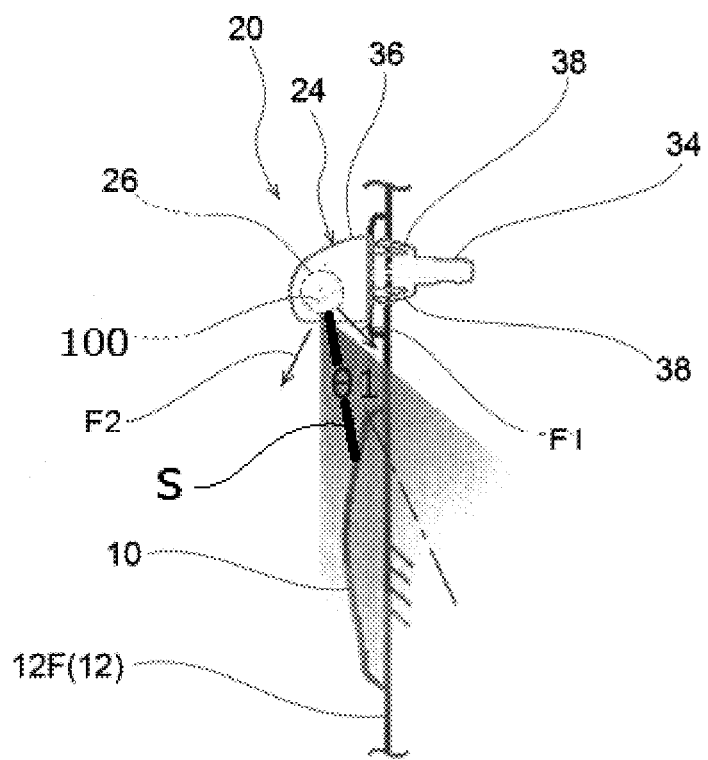
FIG. 15 is a side view, corresponding to FIG. 10, schematically showing paths of washing liquid jetted toward a sensor from a washing fluid jetting nozzle provided with the tip shown in FIG. 12.
Figure 16:
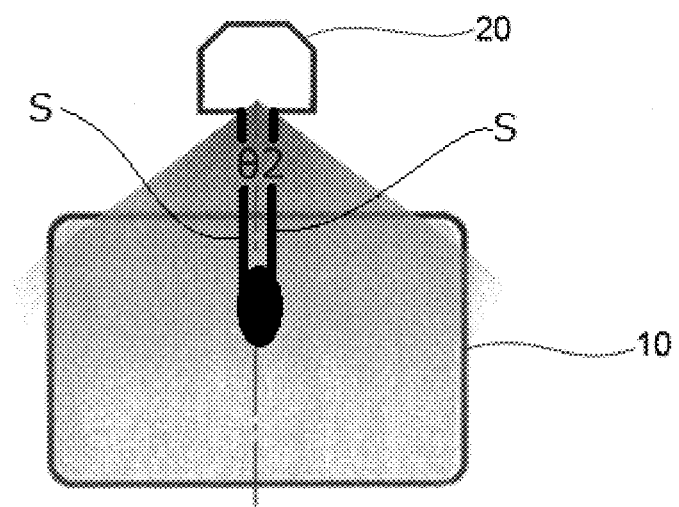
FIG. 16 is a front view, corresponding to FIG. 11, schematically showing paths of the washing liquid jetted toward the sensor from the washing fluid jetting nozzle provided with the tip shown in FIG. 12.

As shown in FIG. 12 to FIG. 14, the tip 100 according to this exemplary embodiment features, in addition to the structures of the tip 28 described above, the formation of two third conduits 102. Portions of the tip 100 according to the present exemplary embodiment that correspond with the tip 28 described above are assigned the same reference symbols as the corresponding portions of the tip 28 described above and are not described here.

As shown in FIG. 12 and FIG. 13, two third conduits 102 that serve as third downstream side channels are formed at the side of the tip 100 at which the right face 66 is provided. The third conduits 102 open out at die side of the tip body 26 at which the right wall 54 is disposed (see FIG. 4). The two third conduits 102 extend in linear shapes from the introduction port 44 of the tip body 26 (see FIG. 6) toward the side at which the tip insertion aperture 46 is formed. The two third conduits 102 extend in parallel with one another, spaced apart in the same direction as the direction in which the first ejection port 76 rind second ejection port 78 are arrayed.

One end of each of the two third conduits 102 serves as a third ejection port 104 that opens out at the side at which the tip face 70 is provided. In the present exemplary embodiment, a distance between the two third ejection ports 104 is greater than the distance between the first ejection port 76 and the second ejection port 78. The other end of one of the third conduits 102 and the other end of the other third conduit 102 are both in fluid communication with the introduction port 44 of the tip body 26.

As shown in FIG. 12 to FIG. 16, according to the washing liquid jetting nozzle 20 provided with the tip 100 described above, a large area of the front surface of the sensor 10 may be washed by washing liquid jetted out from the first ejection port 76 and second ejection port 78, in addition to which a predetermined region of the front surface of the sensor 10 may be concentratedly washed by washing liquid jetted out from the two third ejection ports 104. The washing liquid jetted out from the two third ejection ports 104 is represented by lines marked with the reference symbol S.

In the examples described above, examples are described in which the washing liquid jetting nozzle 20 is used for washing the sensor 10 provided at the front portion 12F of the vehicle 12, but the present disclosure is not limited thus. For example, as shown in FIG. 2, the washing liquid jetting nozzle 20 may be used for washing other sensors 106 and 108, headlamps 110 and so forth, which are provided at four corners 12C and a rear portion 12R of the vehicle 12 and the like.

Exemplary embodiments of the present disclosure are described above. However, the present disclosure is not limited by these descriptions and it will be clear that numerous modifications beyond these descriptions may be embodied within a technical scope not departing from the gist of the disclosure.

For example, in the exemplary embodiment that uses the tip 100 shown in FIG. 12 to FIG. 16, the jetting liquid jetted out from the two third ejection ports 104 is jetted for concentratedly washing a predetermined region, but this is not limiting. Washing liquid jetted out from the third ejection ports 104 may be directed at regions that cannot be reached by washing liquid jetted out from the first ejection port 76 and second ejection port 78, so as to supply the washing liquid thereto.

The first channel 86 and the second channel 8$ are both formed at the side of the tip 28 at which the left face 68 is provided, but may be formed at the side of the tip 28 at which the right face 66 is provided. Further, provided a colliding flow t a be produced, the first channel 86 and the second channel 88 may be formed in respectively different faces of the tip 28.

The present disclosure has been described on the basis of exemplary embodiments, but it will be clear that the present disclosure is not to be limited to these exemplary embodiments and structures. The present disclosure encompasses numerous variant examples and modifications of equivalent scope. In addition, numerous combinations and modes, as well as alternative combinations and modes that include only one element, or more or fewer elements, are within the scope and spirit of the present disclosure.

The invention claimed is:

1. A liquid jetting nozzle comprising:
a nozzle main body having a proximal end and a distal end and including, at the proximal end, an introduction port at which a liquid is introduced, and including, at the distal end, an insertion aperture that communicates with a space within the nozzle main body, the space communicating with the introduction port, the space being bounded by a first interior wall, a second interior wall, a third interior wall and a fourth interior wall, the first and second interior walls opposing each other, the third and fourth interior walls opposing each other, the first and second interior walls being orthogonal to the third and fourth interior walls; and
a nozzle tip that is inserted through the insertion aperture of the nozzle main body and positioned within the space of the nozzle main body, the nozzle tip having a first exterior wall, a second exterior wall, a third exterior wall and a fourth exterior wall, the first, second, third and fourth exterior walls being respectively positioned adjacent to the first, second, third and fourth interior walls of the nozzle main body when the nozzle tip is positioned within the space of the nozzle main body, a first channel and a second channel both being formed in one of the first, second, third and fourth exterior walls of the nozzle tip, the first and second channels extending from a proximal end of the nozzle tip to a distal end of the nozzle tip at which a first ejection port and a second ejection port are formed by respective distal ends of the first and second channels, the first ejection port and the second ejection port each jetting out the liquid that has been introduced via the introduction port, wherein:
the first channel includes a first downstream side channel at a downstream side region of the first channel through which the liquid flows from the introduction port toward the distal end of the first channel at which the first ejection port is formed, and the second channel includes a second downstream side channel at a downstream side region of the second channel through which the liquid flows from the introduction port toward the distal end of the second channel at which the second ejection port is formed, and
an angle formed between the first downstream side channel and the second downstream side channel is configured such that the liquid jetted out from the first ejection port and the liquid jetted out from the second ejection port collide.

2. The liquid jetting nozzle according to claim 1, wherein the angle formed between the first downstream side channel and the second downstream side channel is configured such that when the nozzle main body and the nozzle tip are viewed from a direction in which the first ejection port and the second ejection port are arrayed, a range across which the liquid jetted out from the first ejection port and the liquid jetted out from the second ejection port spread after colliding is wider than a range across which the liquid jetted out from the first ejection port and the liquid jetted out from the second ejection port spread after colliding when the nozzle main body and the nozzle tip are viewed from a direction orthogonal to the direction in which the first ejection port and the second ejection port are arrayed.

3. The liquid jetting nozzle according to claim 1, wherein:
the nozzle tip includes a flow-directing portion located at an upstream side of the first and second channels, the flow-directing portion directing a flow of the liquid introduced via the introduction port, and the flow-directing portion distributing and dividing the liquid into the first channel and the second channel.

4. The liquid jetting nozzle according to claim 1, wherein, in a state in which the nozzle tip is positioned within the space of the nozzle main body, at least a part of the first channel and a part of the second channel are formed between the nozzle tip and one of the first, second, third and fourth interior walls of the nozzle main body.

5. The liquid jetting nozzle according to claim 1, wherein a different one of the first, second, third and fourth exterior walls of the nozzle tip other than the one of the first, second, third and fourth exterior walls that includes the first and second channels, includes a third channel that extends from the proximal end of the nozzle tip to the distal end of the nozzle tip at which a third ejection port is formed, the third ejection port jetting out the liquid introduced via the introduction port in a different direction from a direction of the liquid jetted out from the first ejection port and a direction of the liquid jetted out from the second ejection port, the liquid jetted out from the third ejection port striking a relatively small area of a surface to be wetted by the liquid within a relatively large area of the surface to be wetted by the liquid that is jetted out from the first and second ejection ports.

6. A vehicle sensor washing device comprising a liquid jetting nozzle, the liquid jetting nozzle including:
a nozzle main body having a proximal end and a distal end and including, at the proximal end, an introduction port at which a liquid is introduced, and including, at the distal end, an insertion aperture that communicates with a space within the nozzle main body, the space communicating with the introduction port, the space being bounded by a first interior wall, a second interior wall, a third interior wall and a fourth interior wall, the first and second interior walls opposing each other, the third and fourth interior walls opposing each other, the first and second interior walls being orthogonal to the third and fourth interior walls; and
a nozzle tip that is inserted through the insertion aperture of the nozzle main body and positioned within the space of the nozzle main body, the nozzle tip having a first exterior wall, a second exterior wall, a third exterior wall and a fourth exterior wall, the first, second, third and fourth exterior walls being respectively positioned adjacent to the first, second, third and fourth interior walls of the nozzle main body when the nozzle tip is positioned within the space of the nozzle main body, a first channel and a second channel both being formed in one of the first, second, third and fourth exterior walls of the nozzle tip, the first and second channels extending from a proximal end of the nozzle tip to a distal end of the nozzle tip at which a first ejection port and a second ejection port are formed by respective distal ends of the first and second channels, the first ejection port and the second ejection port each jetting out the liquid that has been introduced via the introduction port, wherein:
the liquid from the first ejection port is jetted out toward a side at which a sensor provided at the vehicle is disposed,
the liquid from the second ejection port is jetted out toward an opposite side from the side at which the sensor is disposed, and
the liquid jetted out from the first ejection port and the liquid jetted out from the second ejection port collide and a collided flow of the liquid is directed at the sensor.

* * * * *